(12) United States Patent
Moriya et al.

(10) Patent No.: US 11,983,487 B2
(45) Date of Patent: May 14, 2024

(54) DOCUMENT CREATION SUPPORT APPARATUS, DOCUMENT CREATION SUPPORT METHOD AND DOCUMENT CREATION SUPPORT PROGRAM

(71) Applicant: Nippon Telegraph and Telephone Corporation, Tokyo (JP)

(72) Inventors: Takaaki Moriya, Musashino (JP); Manabu Nishio, Musashino (JP); Taizo Yamamoto, Musashino (JP); Takashi Utahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/801,780

(22) PCT Filed: Feb. 25, 2020

(86) PCT No.: PCT/JP2020/007394
§ 371 (c)(1),
(2) Date: Aug. 23, 2022

(87) PCT Pub. No.: WO2021/171344
PCT Pub. Date: Sep. 2, 2021

(65) Prior Publication Data
US 2023/0081077 A1  Mar. 16, 2023

(51) Int. Cl.
*G06F 40/166* (2020.01)
*G06F 16/22* (2019.01)
(Continued)

(52) U.S. Cl.
CPC ........ *G06F 40/166* (2020.01); *G06F 16/2246* (2019.01); *G06F 40/14* (2020.01); *G06F 40/279* (2020.01); *G06F 40/35* (2020.01)

(58) Field of Classification Search
None
See application file for complete search history.

(56) References Cited

U.S. PATENT DOCUMENTS 6,317,707 B1 * 11/2001 Bangalore ............. G06F 40/279
  704/255
7,418,443 B2 * 8/2008 Yoshimura .......... G06F 16/3344
(Continued)

FOREIGN PATENT DOCUMENTS

JP    2011154653    8/2011

OTHER PUBLICATIONS

[No Author Listed] [online], "Doxygen," doxygen.jp, Feb. 14, 2011, 3 pages (with English Translation).
(Continued)

*Primary Examiner* — Maikhanh Nguyen
(74) *Attorney, Agent, or Firm* — Fish & Richardson P.C.

(57) ABSTRACT

A document creation assistance apparatus includes a tree structure generation unit configured to analyze a learning document for system development and generate a tree structure representing separate sections of the learning document, a frequency calculation unit configured to calculate, per leaf node of the tree structure, a frequency vector of a word that appears, a question extraction unit configured to extract, according to the frequency vector, a word about which a user is to be questioned, a question presentation unit configured to present a question about the extracted word to the user and receive an answer, and a document generation unit configured to generate a document with the extracted word and the answer set in a section of the separate sections of the leaf node according to the separate sections of the tree structure.

6 Claims, 17 Drawing Sheets

(51) Int. Cl.
*G06F 40/14* (2020.01)
*G06F 40/279* (2020.01)
*G06F 40/35* (2020.01)

(56) References Cited

U.S. PATENT DOCUMENTS

| | | | | |
|---|---|---|---|---|
| 8,832,064 | B2* | 9/2014 | Stenchikova | G06F 16/243 |
| | | | | 707/739 |
| 9,063,975 | B2* | 6/2015 | Isensee | G06F 16/248 |
| 10,268,671 | B2* | 4/2019 | Kaiser | G10L 25/30 |
| 10,409,908 | B2* | 9/2019 | Vinyals | G06N 3/045 |
| 10,909,329 | B2* | 2/2021 | Gao | G06N 3/044 |
| 11,151,203 | B2* | 10/2021 | Natchu | G06F 16/951 |
| 11,204,972 | B2* | 12/2021 | Bell | G06Q 30/0625 |
| 11,227,153 | B2* | 1/2022 | Ayyadevara | G06V 30/412 |
| 11,397,762 | B2* | 7/2022 | Raval Contractor | G06F 40/20 |
| 11,410,024 | B2* | 8/2022 | Barik | G06N 3/084 |
| 11,669,680 | B2* | 6/2023 | Wu | G06F 40/279 |
| | | | | 704/9 |
| 2002/0002454 | A1* | 1/2002 | Bangalore | G06F 40/279 |
| | | | | 704/10 |
| 2013/0346106 | A1* | 12/2013 | Xiao | G06Q 10/10 |
| | | | | 705/3 |
| 2017/0286403 | A1* | 10/2017 | Popescu | G06F 40/211 |
| 2020/0004803 | A1* | 1/2020 | Dernoncourt | G10L 15/26 |
| 2021/0232613 | A1* | 7/2021 | Raval Contractor | G06N 5/02 |
| 2022/0309107 | A1* | 9/2022 | Sen | G06F 40/35 |

OTHER PUBLICATIONS

Spinellis, "Code Documentation," IEEE Software, 2010, 27(4):18-19.

* cited by examiner

DOCUMENT CREATION SUPPORT APPARATUS, DOCUMENT CREATION SUPPORT METHOD AND DOCUMENT CREATION SUPPORT PROGRAM

CROSS-REFERENCE TO RELATED APPLICATIONS

This application is a National Stage application under 35 U.S.C. § 371 of International Application No. PCT/JP2020/007394, having an International Filing Date of Feb. 25, 2020, the disclosure of which is considered part of the disclosure of this application, and is incorporated by reference in its entirety into this application.

TECHNICAL FIELD

The present disclosure relates to a document creation assistance apparatus, a document creation assistance method, and a document creation assistance program.

BACKGROUND ART

In recent years, research has been conducted on the automatic generation of documents. Tools exist that are configured to enter comments in source code and generate a document such as specifications from the source code (NPL 1, NPL 2). Further, in the physical design of a database, there also exist techniques for generating data modeling expressed by a table or a tree (PTL 1).

CITATION LIST

Patent Literature

PTL 1: JP 2011-154653 A

Non Patent Literature

NPL 1: Spinellis Diomidis, "Code Documentation", IEEE Software 27, no. 4, (2010) NPL 2: "Doxygen", http://www.doxygen.jp/

SUMMARY OF THE INVENTION

Technical Problem

Documents such as requirement definition documents and design documents for system development and the like are difficult to create for users unfamiliar with system development, and the creation of high quality documents covering necessary information is complex. The tools of NPL 1 and NPL 2 involve description of necessary information in the source code, making utilization not easy for users unfamiliar with system development.

The present disclosure has been made in view of the circumstances described above, and an object of the present disclosure is to provide a document creation assistance apparatus, a document creation assistance method, and a document creation assistance program configured to provide assistance so as to facilitate creation of a document used in system development, even for a user unfamiliar with system development.

Means for Solving the Problem

To achieve the object described above, an aspect according to the present disclosure is a document creation assistance apparatus including a tree structure generation unit configured to analyze a learning document for system development and generate a tree structure representing separate sections of the learning document, a frequency calculation unit configured to calculate, per leaf node of the tree structure, a frequency vector of a word that appears, a question extraction unit configured to extract, according to the frequency vector, a word about which a user is to be questioned, a question presentation unit configured to present a question about the extracted word to the user and receive an answer, and a document generation unit configured to generate a document with the extracted word and the answer set in a section of the separate sections of the leaf node according to the separate sections of the tree structure.

An aspect according to the present disclosure is a document creation assistance method performed by a document creation assistance apparatus, the document creation assistance method including analyzing a learning document for system development and generating a tree structure representing separate sections of the learning document, calculating, per leaf node of the tree structure, a frequency vector of a word that appears, extracting, according to the frequency vector, a word about which a user is to be questioned, presenting a question about the extracted word to the user and receiving an answer, and generating a document with the extracted word and the answer set in a section of the separate sections of the leaf node according to the separate sections of the tree structure.

An aspect according to the present disclosure is a document creation assistance apparatus program that causes a computer to operate as the document creation assistance apparatus described above.

Effects of the Invention

According to the present disclosure, it is possible to provide a document creation assistance apparatus, a document creation assistance method, and a document creation assistance program configured to provide assistance so as to facilitate creation of a document used in system development, even for a user unfamiliar with system development.

DESCRIPTION OF EMBODIMENTS

Hereinafter, an embodiment of the present disclosure will be described with reference to the drawings.

Overview of Present Embodiment

Figure 1:
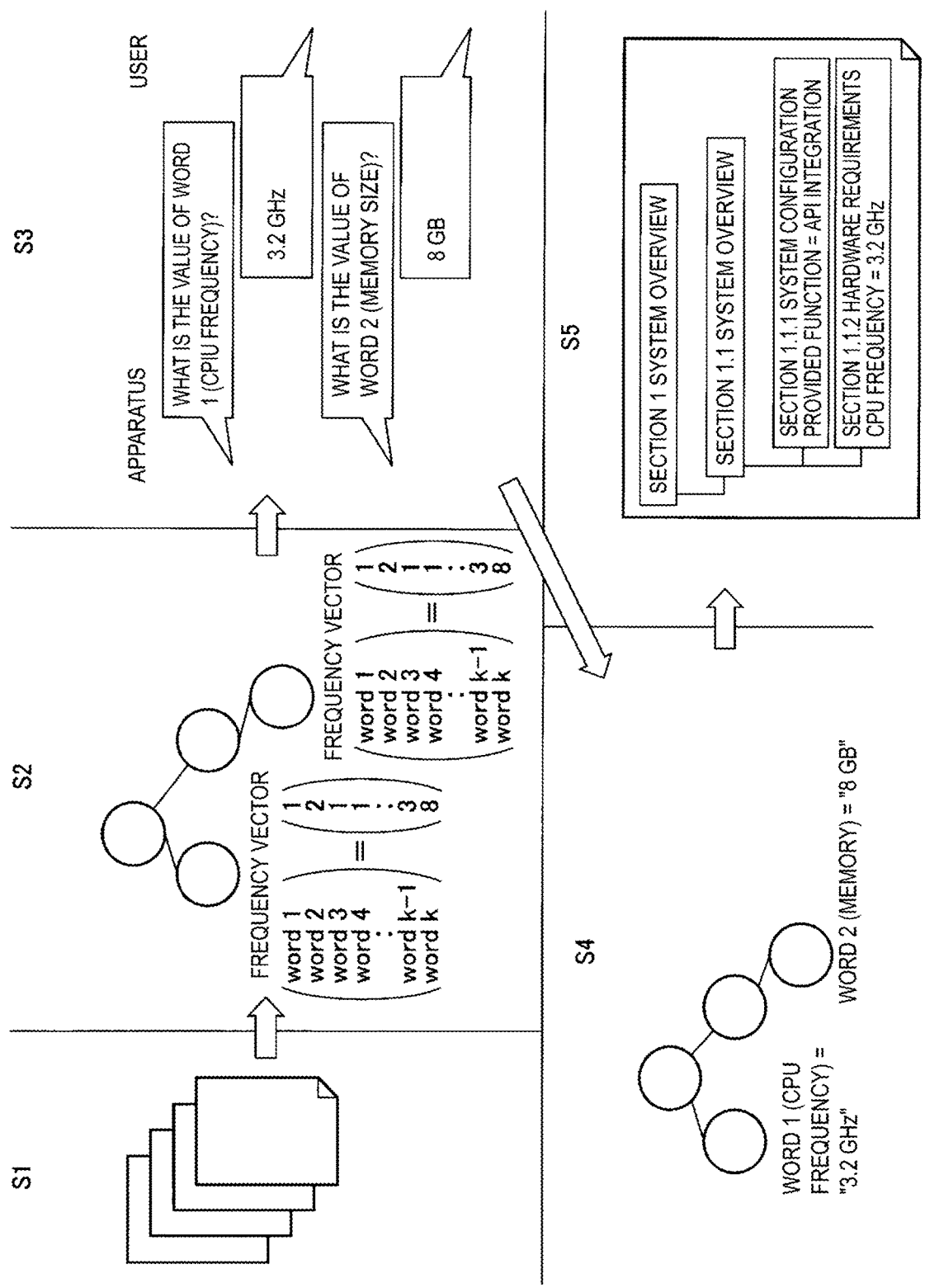
FIG. 1 is an explanatory view for explaining an overview of an embodiment of the present disclosure.

FIG. 1 is an explanatory view for explaining an overview of the present embodiment. A document creation assistance apparatus of the present embodiment assists in the creation of documents for system development. The documents for system development include, for example, requirement definition documents, design documents, and specifications. Assuming that the separate sections of the document for system development are clear, it is appropriate to store the section information in a tree structure. The document creation assistance apparatus of the present embodiment stores the separate sections and word frequencies of occurrence in a tree structure, questions a user about the words and values thereof, and fills in the values, thereby assisting with document creation.

Specifically, the document creation assistance apparatus reads a learning document for system development (S1). Next, the document creation assistance apparatus learns a section composition and generates and stores a tree structure (tree) representing each section. Further, the document creation assistance apparatus calculates the frequencies (appearance frequencies) of the words in each section, and generates and stores frequency vectors (S2).

Next, the document creation assistance apparatus considers each word to be a parameter name and questions the user about the parameter values (S3). The words for questioning are selected on the basis of the frequency of occurrence in the frequency vector. The user answers the questions. The answers of the user correspond to the parameter values. The document creation assistance apparatus sets the answers of S3 by the user into the tree structure of S2 (S4). As a result, a tree structure can be generated in which the separate sections of the learning document are represented, and the parameter values of the words that appear in each section are set. Then, the document creation assistance apparatus 1 generates a document that presents the tree structure of S5 (S5).

Figure 2:
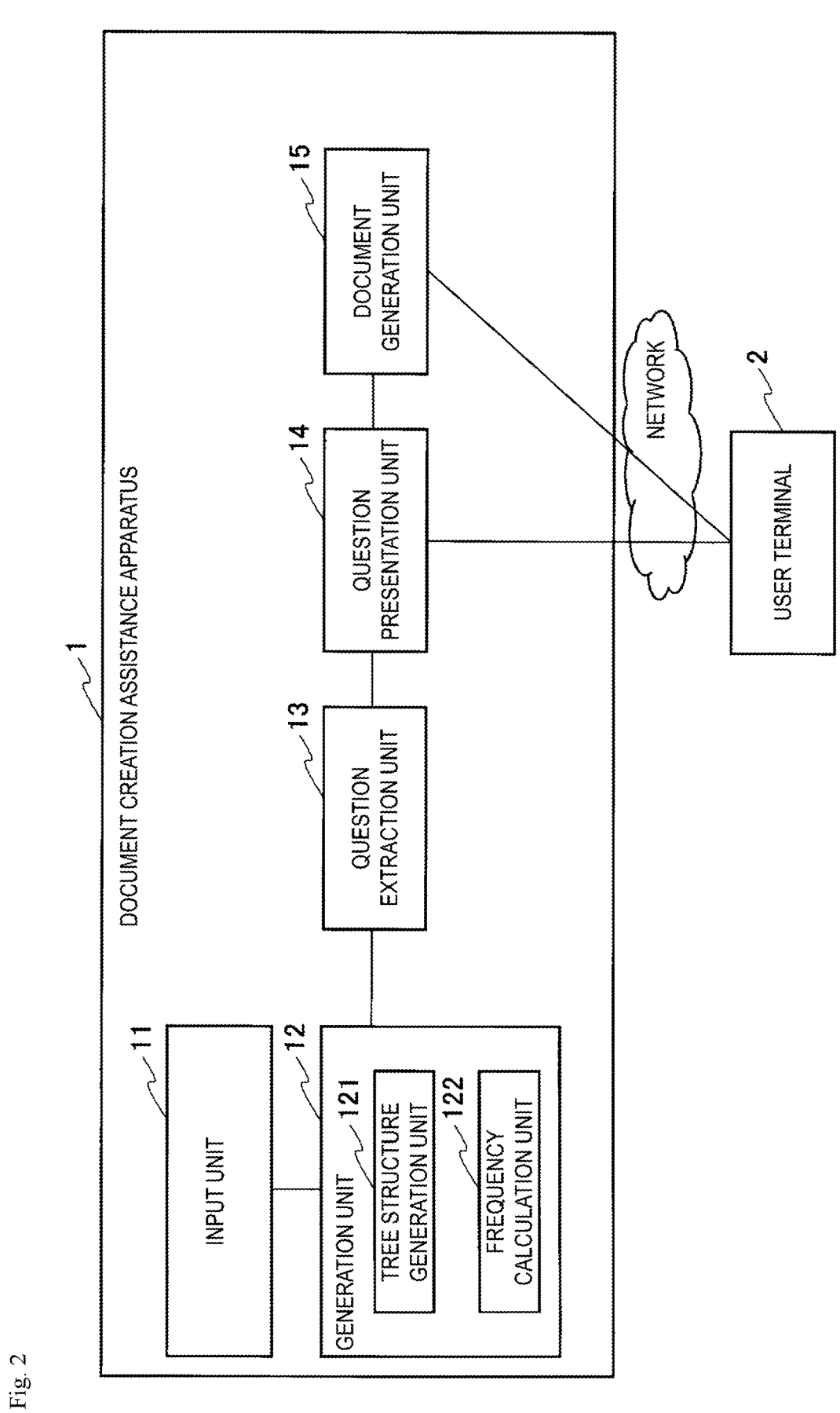
FIG. 2 is a block diagram illustrating a configuration of a document creation assistance apparatus according to the embodiment of the present disclosure.

Configuration of Document Creation Assistance Apparatus FIG. 2 is a configuration example of a document creation assistance apparatus 1 according to the present embodiment. The illustrated document creation assistance apparatus 1 is communicably connected with a user terminal 2 via a network. The user terminal 2 is, for example, a terminal device such as a personal computer (PC), a tablet, or a smartphone.

The document creation assistance apparatus 1 is a device that assists in the creation of a document by a user. The illustrated document creation assistance apparatus 1 includes an input unit 11, a generation unit 12, a question extraction unit 13, a question presentation unit 14, and a document generation unit 15.

The input unit 11 inputs and stores at least one learning document for system development in a storage unit (not illustrated). The generation unit 12 includes a tree structure generation unit 121 and a frequency calculation unit 122. The tree structure generation unit 121 reads (analyzes) the input learning document, and generates a tree structure indicating the separate sections of the learning document. The tree structure generation unit 121 may combine tree structures by performing a logical sum operation on a plurality of the tree structures. The frequency calculation unit 122 calculates the frequency vectors of the words that appear for every leaf node of the tree structure. The frequency calculation unit 122 adds the frequency vectors of common leaf nodes when combining tree structures.

The question extraction unit 13 extracts words about which the user is to be questioned on the basis of the frequency vector. The question extraction unit 13 of the present embodiment extracts the word having the highest frequency of occurrence or a plurality of the words having higher frequencies of occurrence for each leaf node.

The question presentation unit 14 presents questions about the words extracted by the question extraction unit 13 to the user and receives answers. The question presentation unit 14 sets the questions and the answers in corresponding leaf nodes of the tree structure. The document generation unit 15 generates and stores in the storage unit a document in which the extracted words and the answers are set in the sections of the leaf nodes in the separate sections of the tree structure. The document generation unit 15 transmits the generated document to the user terminal 2 and presents the generated document to the user.

FIGS. 3 to 7 are explanatory views for explaining the processing of the generation unit 12. The learning document is assumed to be a document in which the separate sections are clearly stated (for example, 1.1.1 Overview, 1.1.2 Preconditions).

Figure 3:
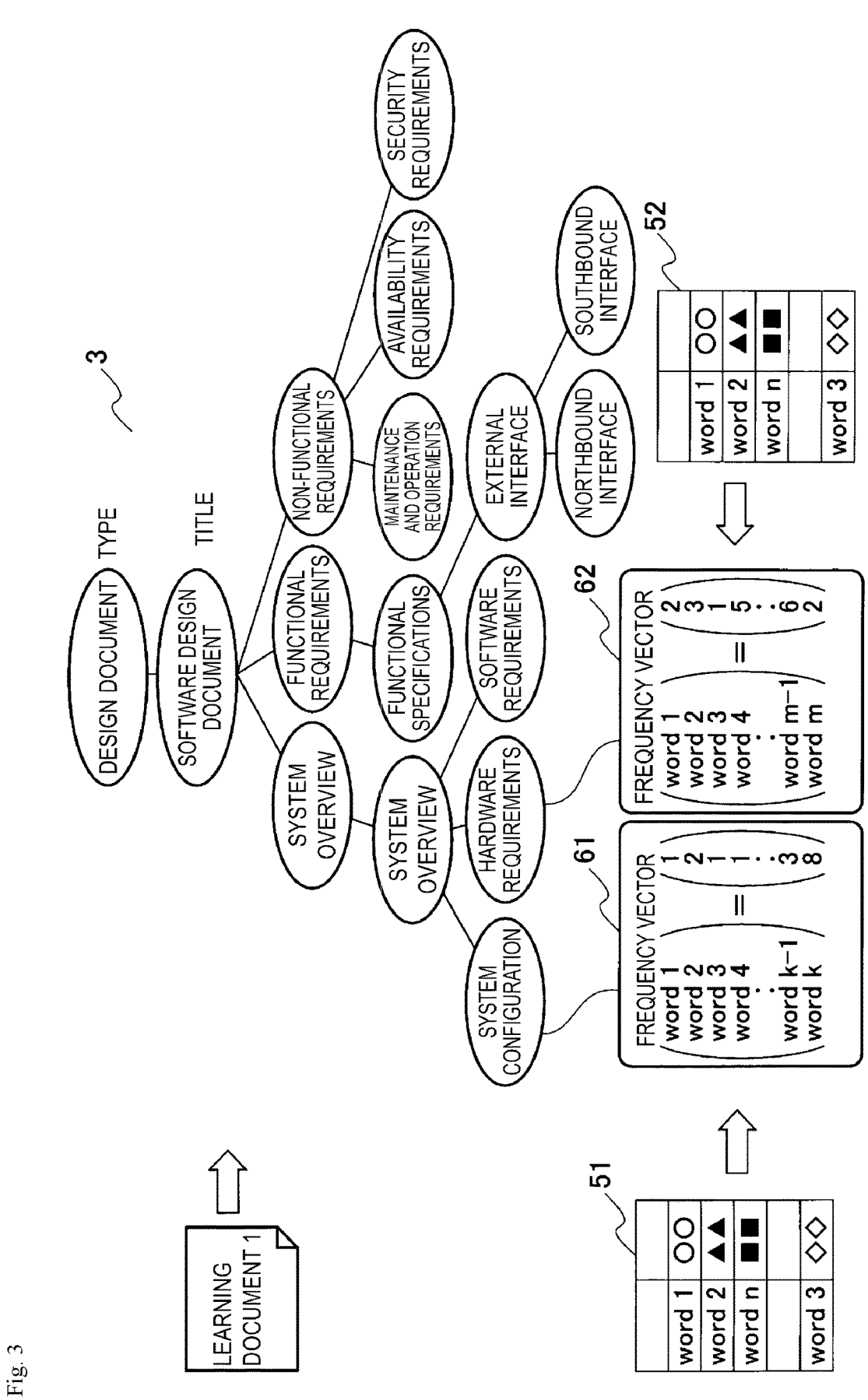
FIG. 3 is a diagram illustrating a tree structure of a learning document 1.

FIG. 3 is a diagram illustrating a tree structure 3 of the learning document 1. As illustrated, the tree structure generation unit 121 uses a type, a title, and section names of the read learning document 1 to generate a tree structure of the learning document 1. In the tree structure illustrated, the tree structure generation unit 121 sets "type" into an uppermost root node and "title" into an internal node having the root node as the parent node.

The title is, for example, the most prominent clause on the first page of the learning document. For example, the title is set as the phrase having the largest font size. Alternatively, the title may be the first clause on the first page. Alternatively, the title may be a clause for which an enhanced font is used on the first page. The type is the last noun of the title obtained by morphological analysis of the title (for example, "XX Design Document" and "XX External Condition Specifications"). The tree structure generation unit 121 generates a tree structure with a deepening hierarchy so as to correspond to "Section 1," "Section 1.1," "Section 1.1.1," and the like.

The frequency calculation unit 122 calculates the frequency vectors of the leaf nodes of the generated tree structure. A leaf node is the lowermost node without a child node. In the present embodiment, the frequency calculation unit 122 morphologically analyzes a "table" that appears in a section of a leaf node of the learning document, considers the words of the data items in the table to be parameter names, and calculates a frequency vector representing the frequency of occurrence of these parameter names (hereinafter referred to as "words"). Here, one frequency vector is always associated with a leaf node. The frequency calculation unit 122 counts the number of times each word appears in the section of the leaf node, and uses the number of times the word appears as the frequency of occurrence of the word. For example, the frequency vector is a column vector with each frequency of occurrence set as a row.

Note that the frequency calculation unit 122 may analyze not only the words in the table but also sentences written in the section of the leaf node, extract the words (parameter names) for which values are set, and calculate the frequency vector of the words.

In the illustrated example, a frequency vector 61 corresponding to a table 51 written in the section "System Configuration" of the learning document 1, and a frequency vector 62 corresponding to a table 52 written in the section "Hardware Configuration" are illustrated. The frequency vectors of the other leaf nodes are omitted. The tree structure and the frequency vectors are stored in a storage unit (not illustrated).

Figure 4:
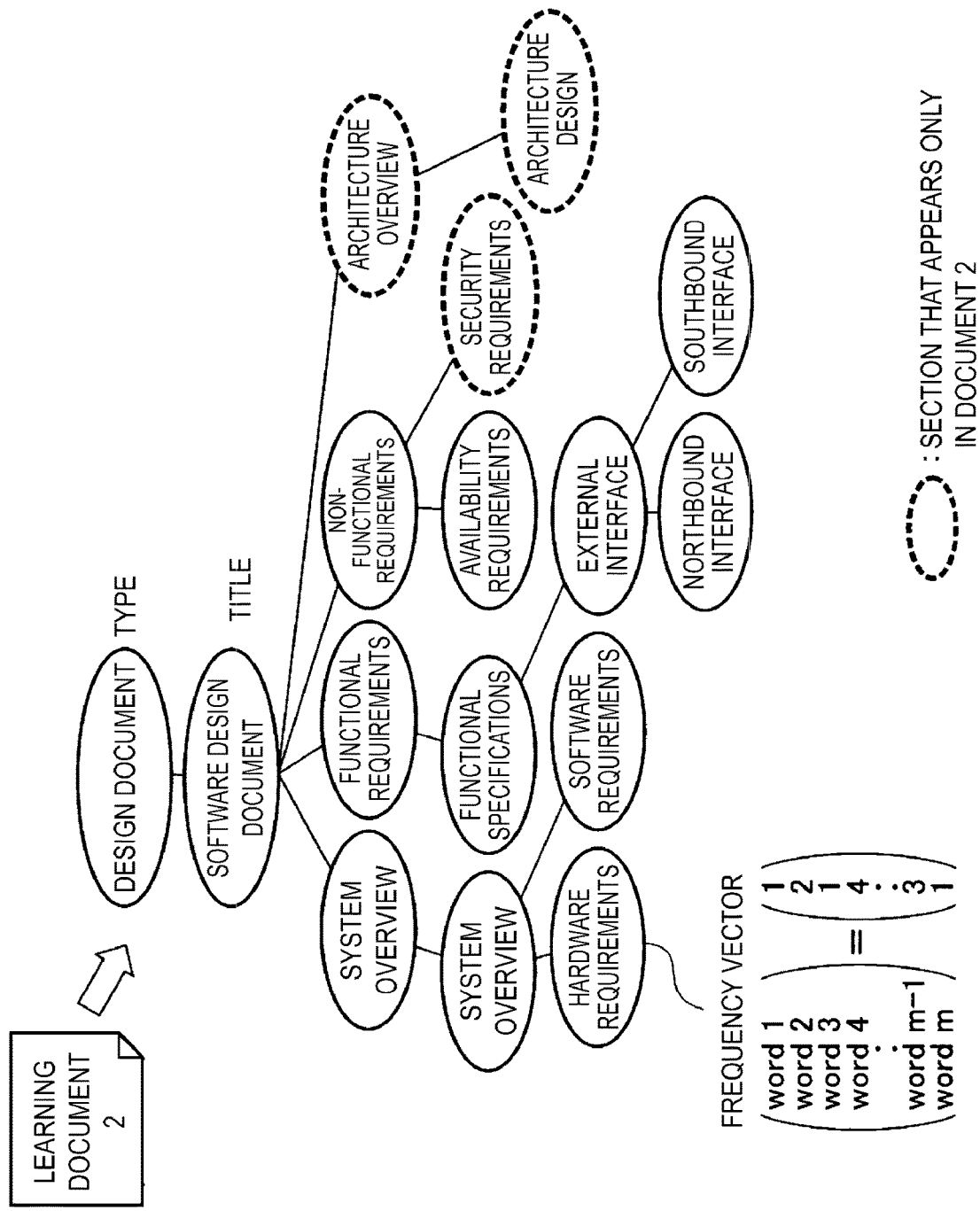
FIG. 4 is a diagram illustrating a tree structure of a learning document 2.

FIG. 4 is a diagram illustrating a tree structure of the read learning document 2. As with the learning document 1, the tree structure generation unit 121 generates the tree structure of the learning document 2. The illustrated "Architecture Overview," "Architecture Design," and "Security Requirements" are sections (nodes) that exist only in the learning document 2, not in the learning document 1. On the other hand, "Maintenance and Operation Requirements" and "System Configuration" of the learning document 1 illustrated in FIG. 3 are sections that exist only in the learning document 1, not in the learning document 2. In the illustrated example, only the frequency vector of "Hardware Requirements" of the learning document 2 is illustrated, and the frequency vectors of the other leaf nodes are omitted.

Figure 5:
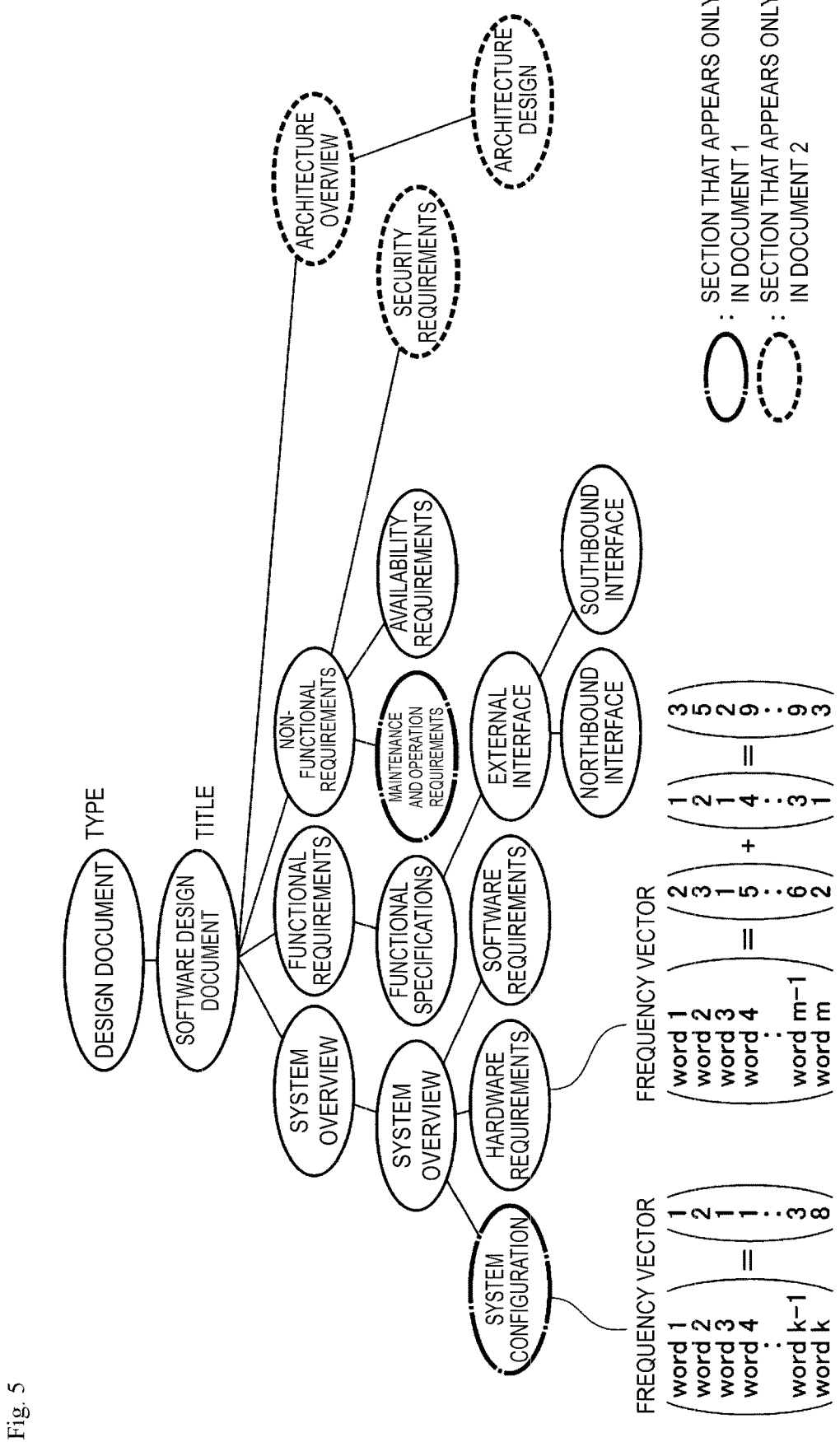
FIG. 5 is a diagram illustrating a tree structure obtained by combining the tree structure of the learning document 1 and the tree structure of the learning document 2.

FIG. 5 is a diagram illustrating a tree structure obtained by combining the tree structure of the learning document 1 and the tree structure of the learning document 2. The tree structure generation unit 121 generates a tree structure each time an input learning document is read, and combines the tree structure with already generated tree structures. Specifically, the tree structure generation unit 121 combines tree structures by performing a logical sum operation (OR) on a plurality of the tree structures. In a case in which the learning document 1 and the learning document 2 have section names (nodes) having the same meaning but different expressions (for example, "Functional Specifications" and "Functional Specs"), the tree structure generation unit 121, when executing the logical sum operation, uses a synonym dictionary (not illustrated) provided in the document creation assistance apparatus 1 and considers the section names to be the same.

When the tree structures are combined, the frequency calculation unit 122 adds the frequency vectors of common leaf nodes. In the illustrated example, the frequency calculation unit 122 adds the frequency vector of "Hardware Requirements" of the learning document 1 and the frequency vector of "Hardware Requirements" of the learning document 2.

In this way, the tree structure generation unit 121 and the frequency calculation unit 122 generate a tree structure (including frequency vectors) for the learning documents input one after the other, and combines the tree structure and previously combined tree structures.

Figure 6:
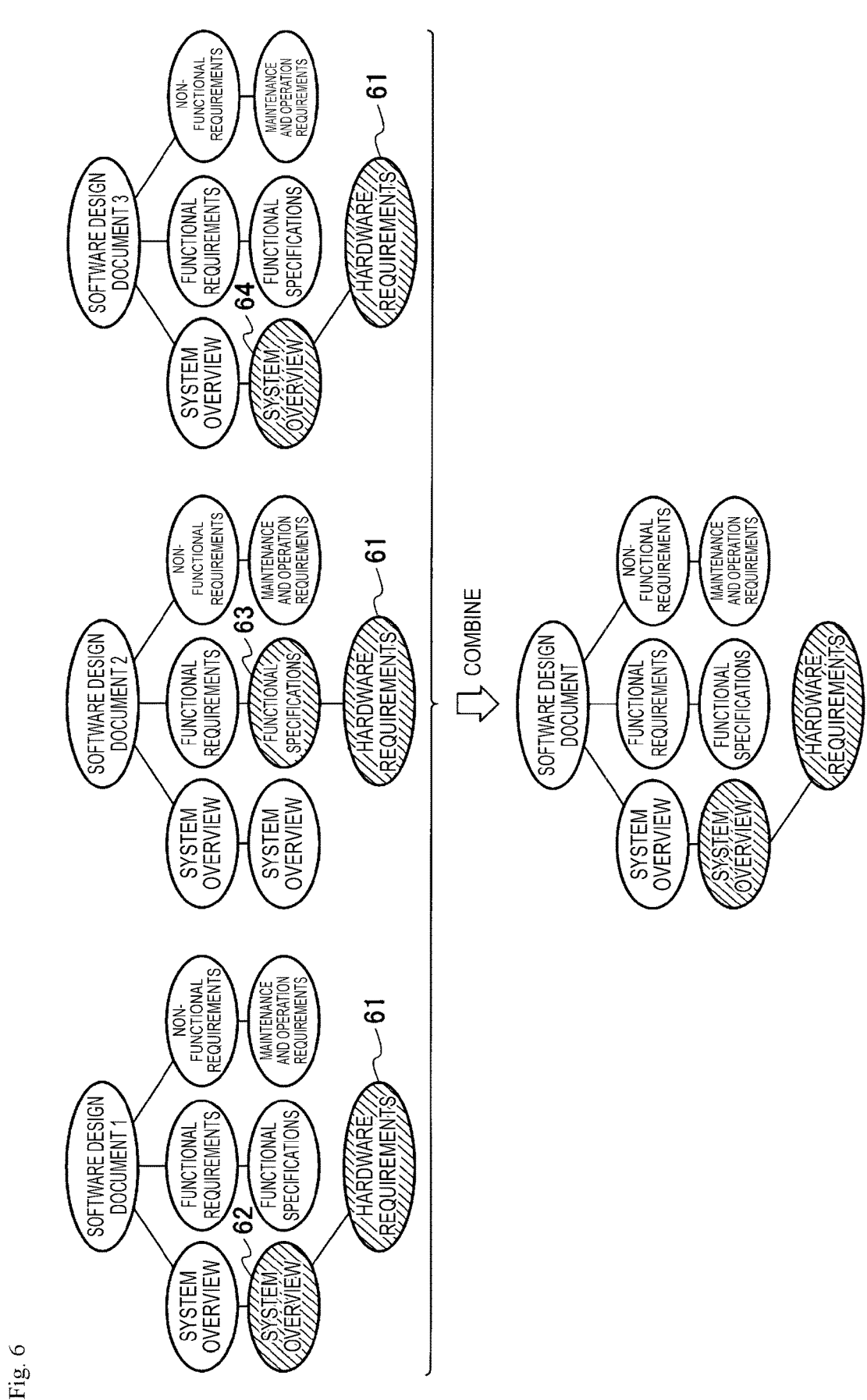
FIG. 6 is an explanatory view for explaining how the tree structures are combined when leaf nodes belonging to different parent nodes exist.

FIG. 6 is an explanatory view for explaining how tree structures are combined when leaf nodes belonging to different parent nodes exist in a plurality of the learning documents. Certain leaf nodes may exist in a plurality of learning documents, but belong to different parent nodes. In the illustrated example, the parent node of the "Hardware Requirements" 61 is the "System Overview" 62 in the software design document 1, "Functional Specifications" 63 in the software design document 2, and "System Overview" 64 in software design document 3.

In such a case, the tree structure generation unit 121 adds a leaf node under the parent node having the highest frequency of occurrence to combine the tree structures. In the illustrated example, the frequency of occurrence of a case in which the parent node of the "Hardware Requirements" 61 is "System Overview" (case in which 62 and 64 are parent nodes in the illustrated example) is higher than that of a case in which the parent node is "Functional Specifications" (case in which 63 is the parent node in the illustrated example). In this case, the tree structure generation unit 121 arranges "Hardware Requirements" as a child node of "System Overview" and combines the tree structures.

Figure 7:
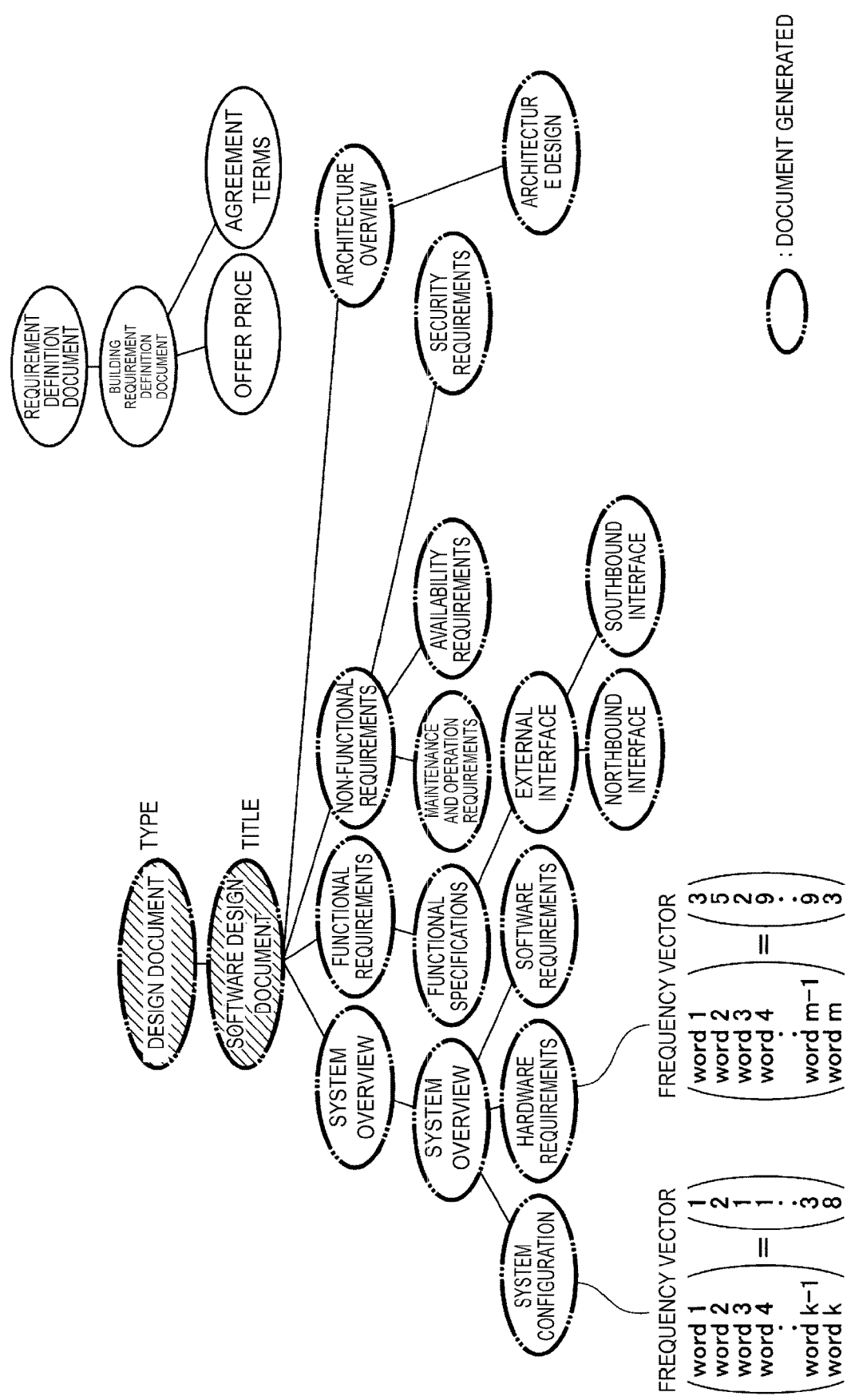
FIG. 7 is a diagram illustrating a plurality of the tree structures.

FIG. 7 is a diagram illustrating a plurality of tree structures. In the illustrated example, the tree structures of "Design Document" and "Requirement Definition Document" are illustrated. In a case in which a plurality of tree structures are generated as a result of combination, the tree structure generation unit 121 displays the type (root node) and the title of each tree structure on the user terminal 2 and has the user make a selection. The user selects a type or a title to be created. The subsequent processing is described below given that the user selects "Software Design Document". In this case, the document creation assistance apparatus 1 assists in generating a "software design document."

Figure 8:
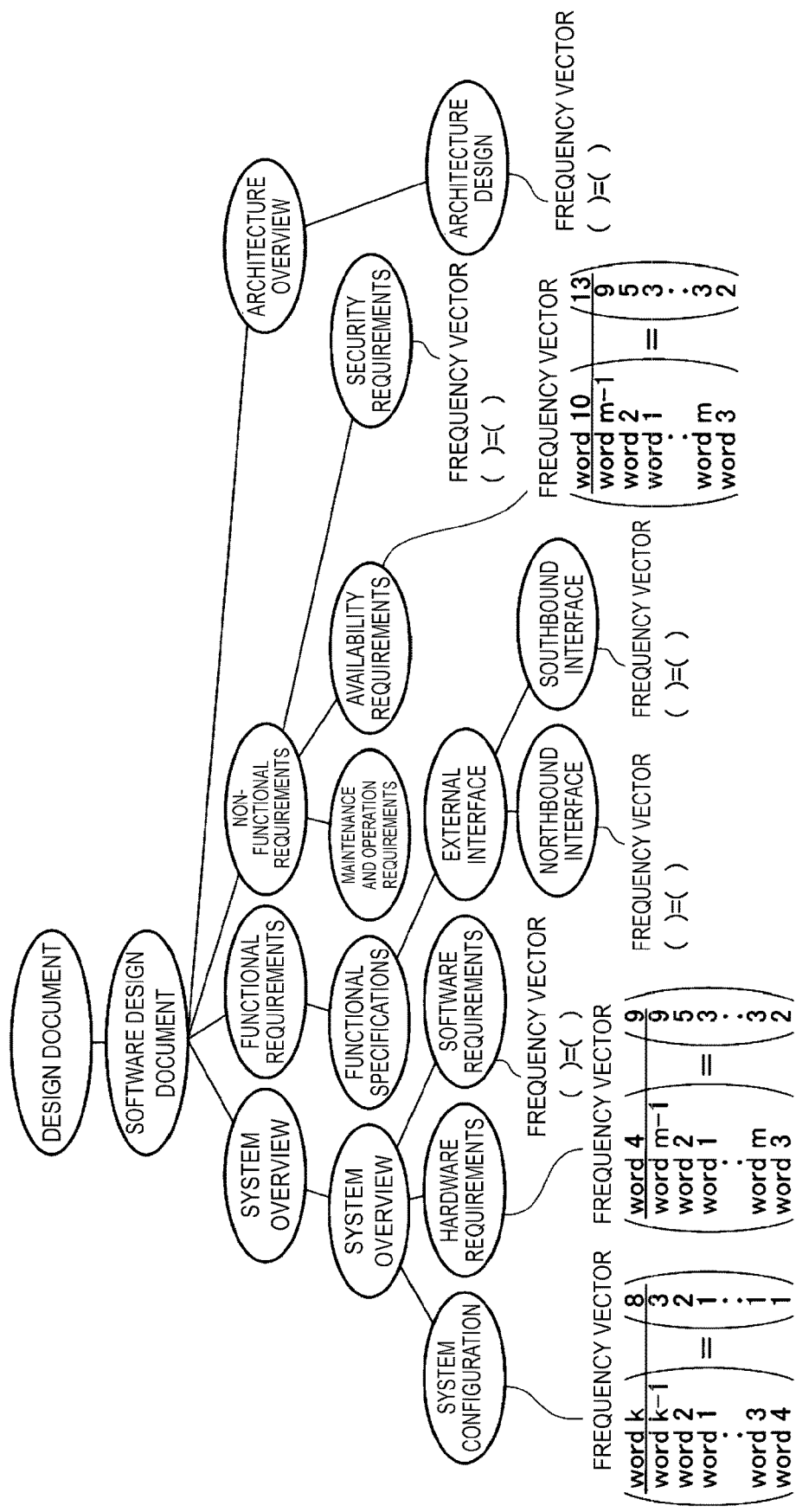
FIG. 8 is an explanatory view for explaining processing of a question extraction unit.

FIG. 8 is an explanatory view for explaining the processing of the question extraction unit 13. The question extraction unit 13 sorts the elements, that is, words (rows), of each frequency vector in descending order of frequency of occurrence. Then, the question extraction unit 13 extracts the word having the highest frequency of occurrence for each leaf node in order to ask the user a question. Specifically, the question extraction unit 13 extracts the words of the uppermost rows of the frequency vectors of all leaf nodes in order, starting from the left side of the tree structure (that is, in ascending order by section number). Then, the question presentation unit 14 questions the user about the values of the extracted words in the order extracted by the question extraction unit 13. In the illustrated example, the question presentation unit 14 asks the user about the value of "word k" of "System Configuration" and subsequently asks the user about the value of "word 4" of "Hardware Requirements."

Thus, in the present embodiment, highly important words are extracted across a plurality of sections and the user is questioned about the words, making it possible to express a comprehensive document by an absolute minimum number of words. Further, in the present embodiment, questions are asked in order, starting from the left side of the tree structure (in ascending order by section number), thereby transitioning from general questions to detailed questions, making it possible to improve the ease of answering by the user. Note that, rather than only the uppermost word, a plurality of words in an upper area of each frequency vector may be extracted for questioning.

Figure 9:
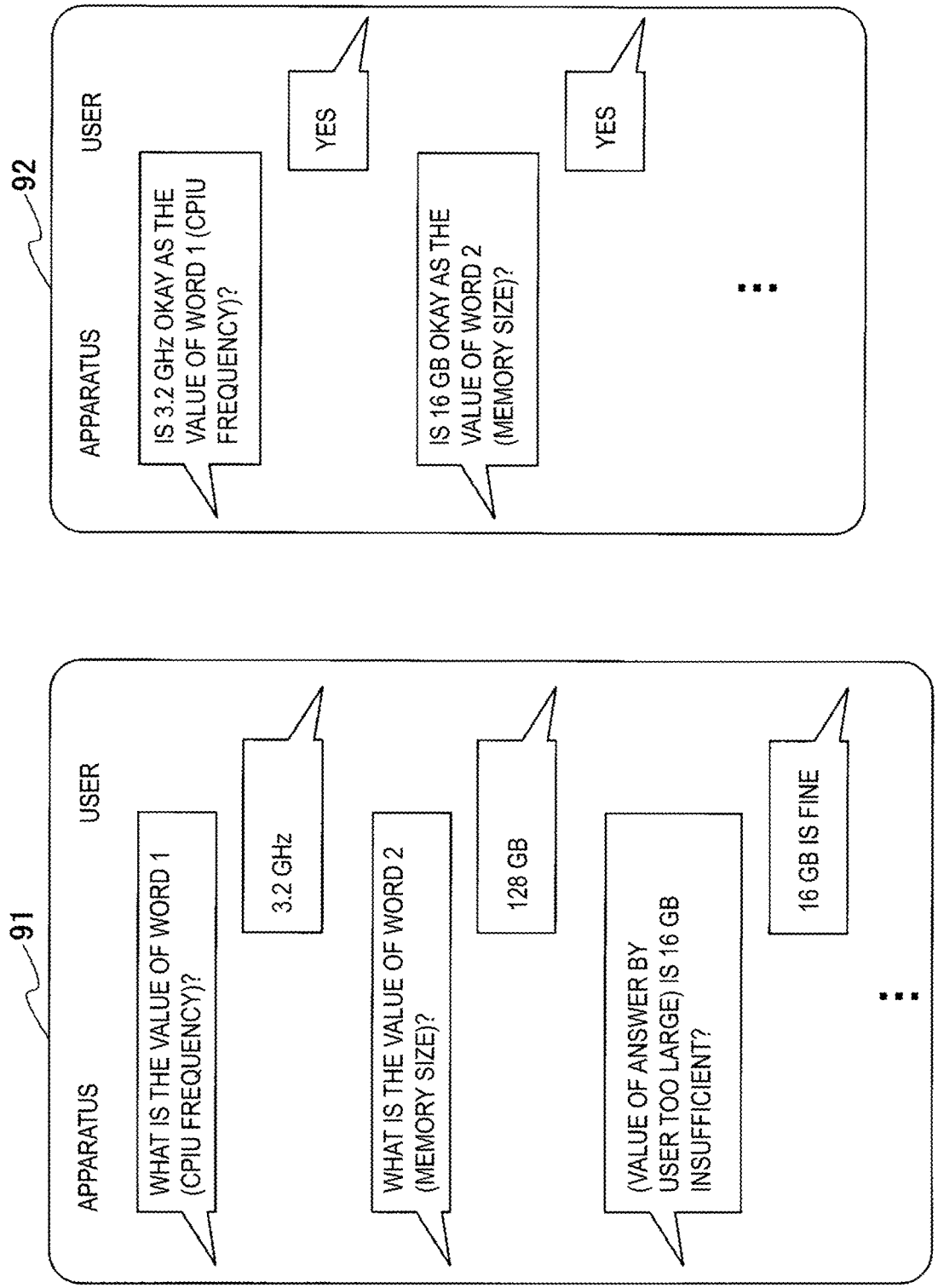
FIG. 9 is an explanatory view for explaining questioning by a question presentation unit.

FIG. 9 is an explanatory view for explaining the questioning by the question presentation unit 14. The question presentation unit 14 may interactively ask the user questions as illustrated. As a dialogue system, commercial technologies or products are used. The questions include an open question type 91, in which the respondent freely thinks and answers, and a closed question type 92, in which the answers are limited, such as by answering "Yes" or "No."

The question presentation unit 14 may store in advance default values as the values of each word and interact with the user using the default values. The default values may be values entered in a table of the learning document. Further, in a case in which a word appears in a plurality of the learning documents, the value having the highest frequency of occurrence may be set to be the default value. For example, assume that, in a case in which the word "CPU frequency" appears in a plurality of the learning documents, "CPU frequency=3 GHz" appears in a table of the learning document 1, "CPU frequency=2.4 GHz" appears in a table of the learning document 2, and "CPU frequency=3 GHz" appears in a table of the learning document 3. In this case, the question presentation unit 14 sets the default value of the CPU frequency as "3 GHz," which has the highest frequency of occurrence.

For the open question type 91, the question presentation unit 14 may calculate, after the user responds with a value, a difference (discrepancy) between this value and the default value and, in a case in which the difference is greater than a predetermined threshold value, present the default value to the user and ask a question such as, "Isn't the default value more appropriate?" For the closed question type 92, the question presentation unit 14 may ask the user, assuming that a document is to be generated using default values from the start, "Is 3 GHz (default value) okay?"

Figure 10:
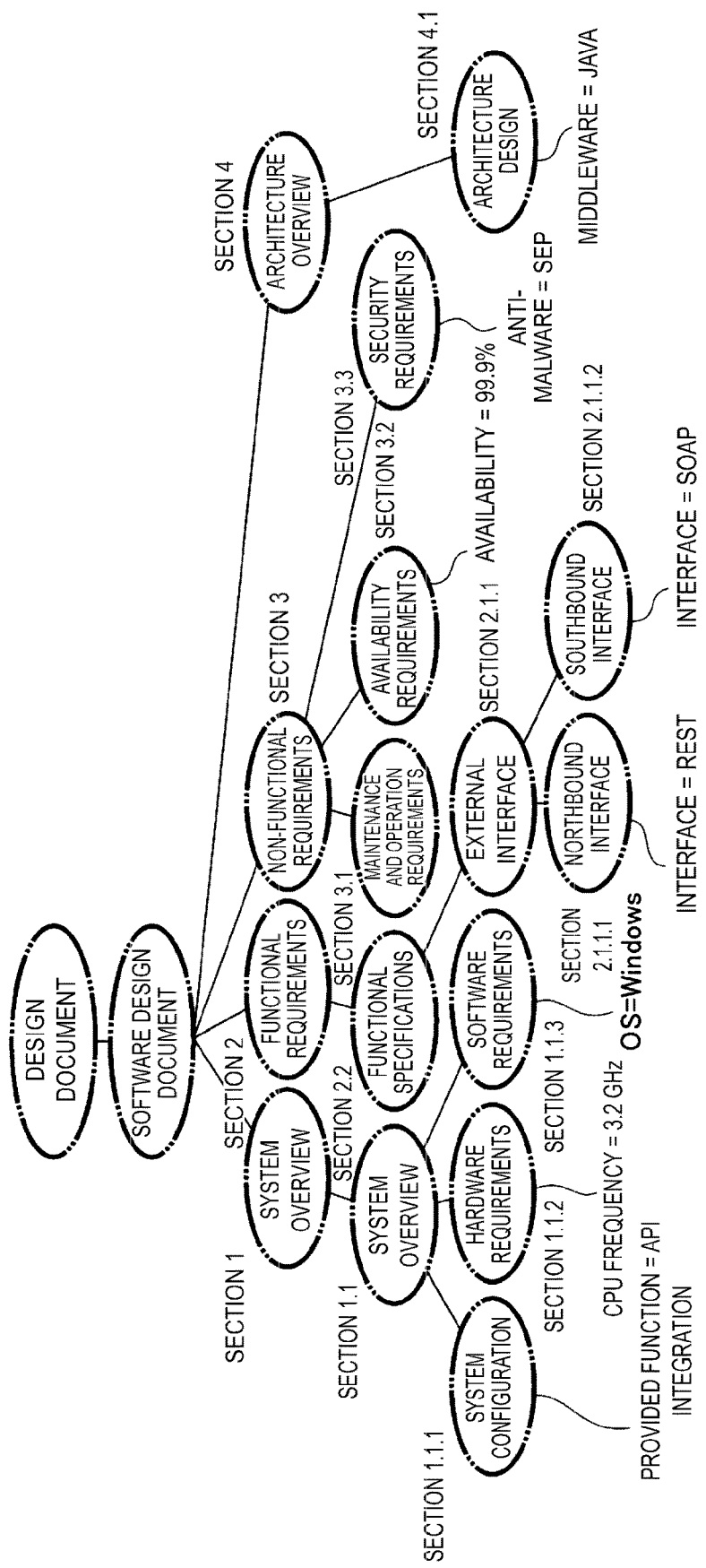
FIG. 10 illustrates a tree structure in which answers of a user are set in leaf nodes.

FIG. 10 illustrates a tree structure in which the answers of the user are set in the leaf nodes of the tree structure. The question presentation unit 14 sets the answers from the user into each leaf node of the tree structure and stores the tree structure in the storage unit.

Figure 11:
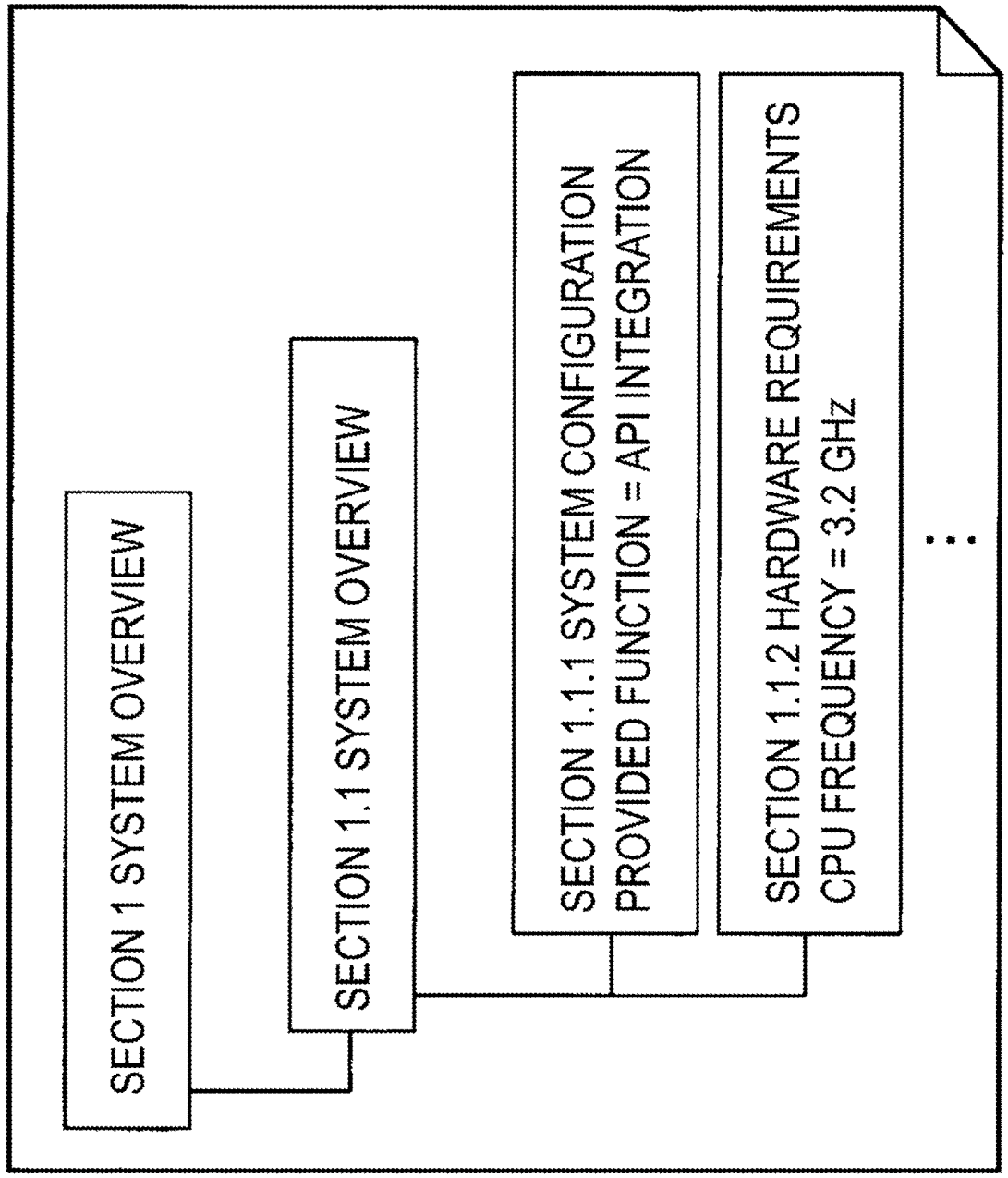
FIG. 11 is a configuration example of a document generated by the document generation unit.

FIG. 11 is a diagram illustrating an example of a document generated by the document generation unit 15. The document generation unit 15 generates and stores in the storage unit a document in which the words extracted by the question extraction unit 13 and the answers are set in the sections of the leaf nodes in the separate sections of the tree structure illustrated in FIG. 10. The item numbers (section numbers) of the separate sections of the tree structure are set in order, starting from the left of the tree structure. This item number may be set by the document generation unit 15, or may be set by the tree structure generation unit 121 during tree structure generation or combination. In the present embodiment, the document generation unit 15 sets the item number and the title of the corresponding section of the learning document for each node of the tree structure to generate the document. The document generation unit 15 displays the generated document on the user terminal 2 and presents the generated document to the user.

Operation of Document Creation Assistance Apparatus

Hereinafter, operation of the document creation assistance apparatus 1 according to the present embodiment will be described.

Figure 12:
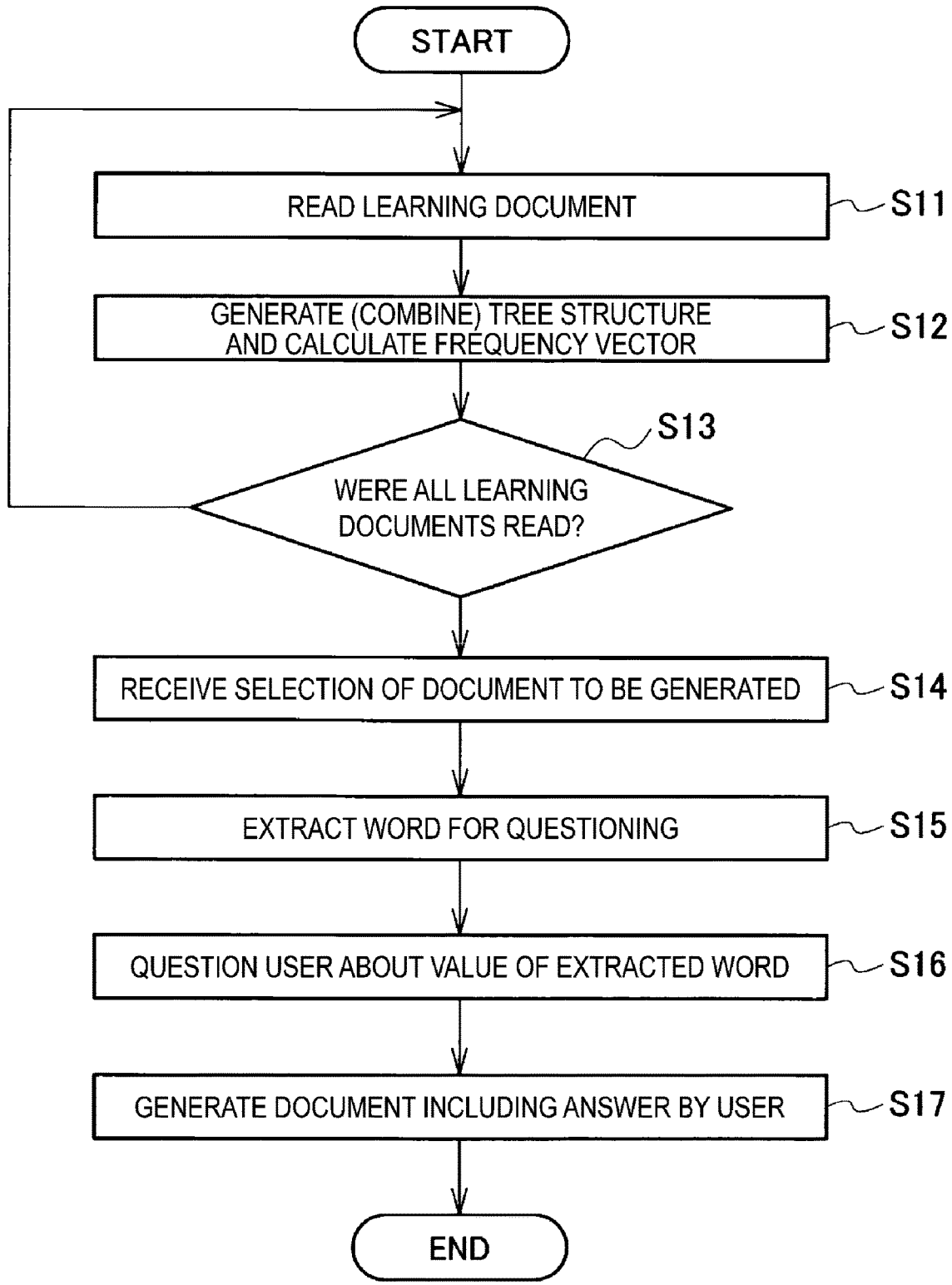
FIG. 12 is a flowchart illustrating operation of the document creation assistance apparatus.

FIG. 12 is a flowchart illustrating the operation of the document creation assistance apparatus 1. The document creation assistance apparatus 1 reads the input learning document (S11). The document creation assistance apparatus 1 generates (combines) the tree structure indicating the separate sections of the learning document, and calculates the frequency vectors of the words that appear for each leaf node of the tree structure (S12). In a case in which there is a learning document that has not been read (S13: NO), the document creation assistance apparatus 1 returns to S11 and repeats the subsequent processing.

In a case in which all learning documents have been read (S13: YES), the document creation assistance apparatus 1 receives a selection of a tree structure of the generated document from the user (S14). In a case in which there is only one tree structure, S14 is omitted.

The document creation assistance apparatus 1 extracts the words about which the user is to be questioned on the basis of the frequency vector of each leaf node of the received tree structure (S15). The document creation assistance apparatus 1 presents questions about the extracted words to the user and receives answers (S16). The document creation assistance apparatus 1 generates a document in which the extracted words and the answers are set in the sections of the leaf nodes in the separate sections of the tree structure (S17). Then, the document creation assistance apparatus 1 stores the created document in a storage unit (not illustrated), and transmits (outputs) the created document to the user terminal 2.

Modified Example 1 of Question Extraction Unit

Figure 13:
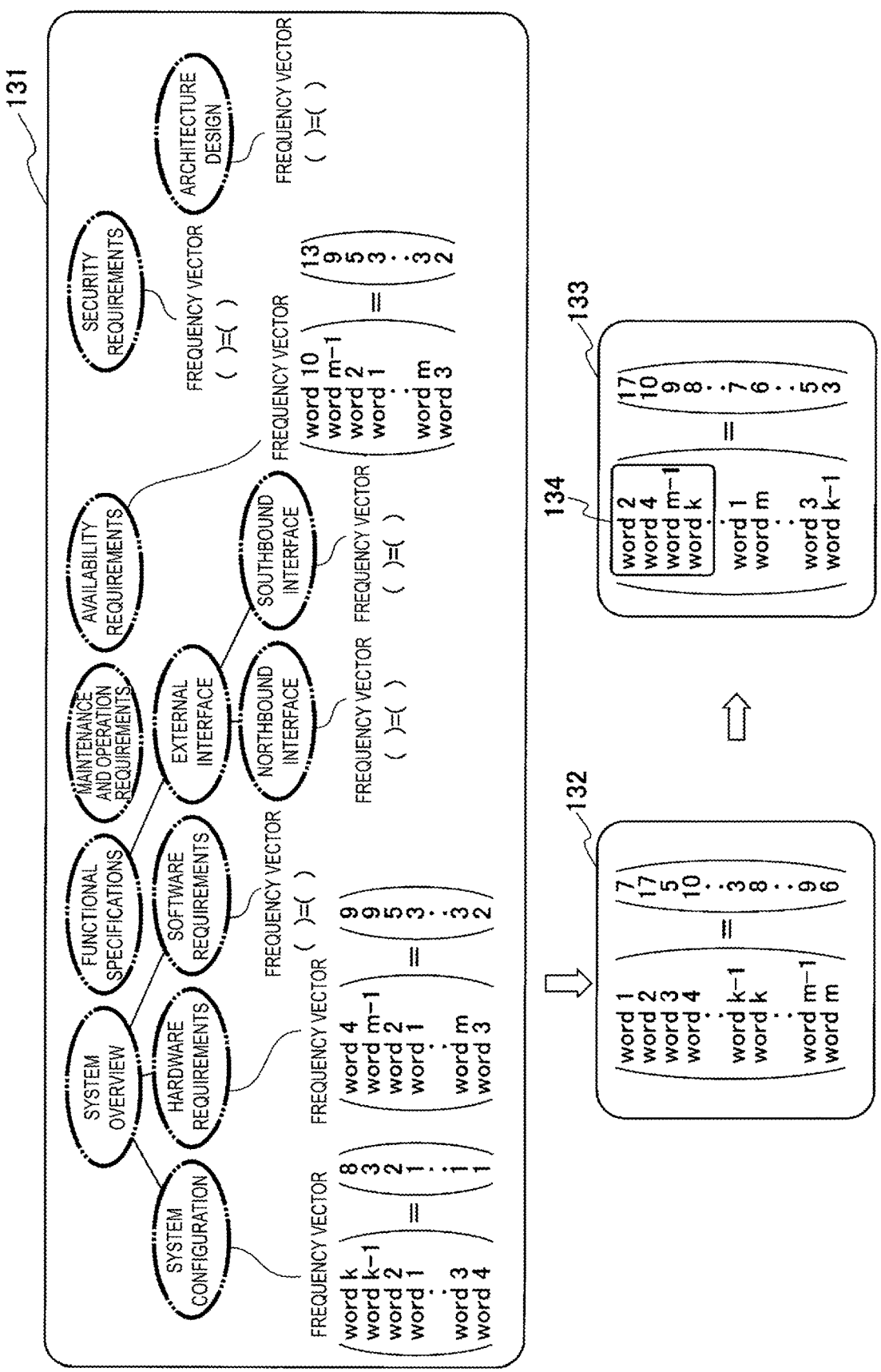
FIG. 13 is an explanatory view for explaining a first modified example of the question extraction unit.

FIG. 13 is an explanatory view for explaining a first modified example of the question extraction unit 13. In this modified example, the question extraction unit 13 is configured to add the frequency vectors of all of the leaf nodes to calculate an overall frequency vector, and extract a plurality of words having higher frequencies of occurrence from the words of the overall frequency vector. The question presentation unit 14 questions the user about the values of the extracted words.

A tree structure 131 illustrated in FIG. 13 illustrates a portion of a tree structure that includes leaf nodes and a frequency vector for each leaf node. The question extraction unit 13 adds all of the frequency vectors to calculate an overall frequency vector 132. Then, the question extraction unit 13 sorts the words (rows) in descending order of frequency of occurrence in the overall frequency vector 132, and generates an overall frequency vector 133 after sorting. Then, the question extraction unit 13 extracts upper n words 134 of the sorted overall frequency vector 133. The question presentation unit 14 questions the user about the values of the extracted words. n is an integer of one or greater. For example, because the word "word k" is an element of the frequency vector of "System Configuration," the word "word k" and the value given in the answer by the user is entered in the System Configuration section in the generated document.

In this modified example, as compared with the embodiment described above, words are not extracted evenly across each section. Rather, words of high importance throughout the document can be extracted for questioning.

Modified Example 2 of Question Extraction Unit

Figure 14A:
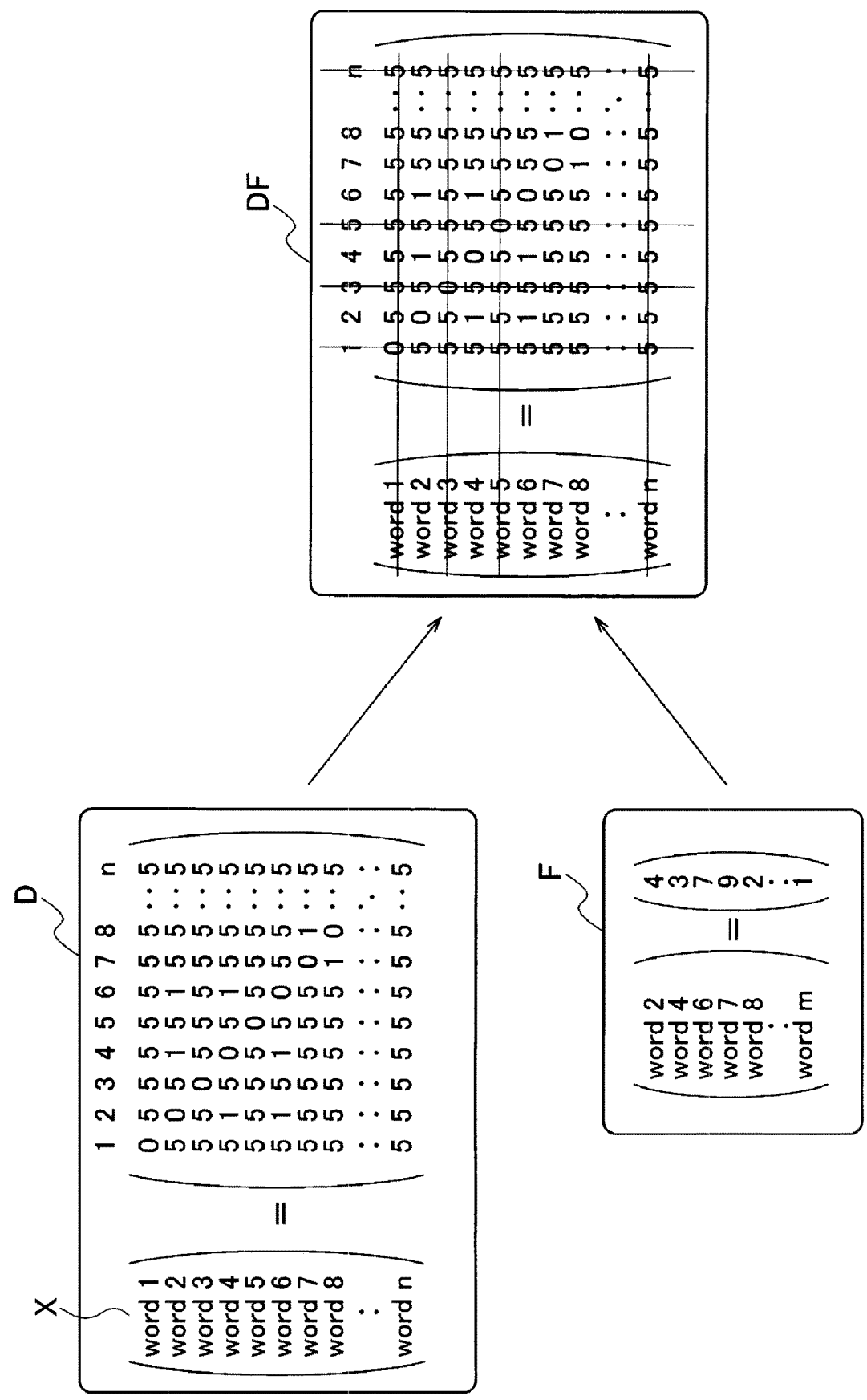
FIG. 14A is an explanatory view for explaining a second modified example of the question extraction unit.
Figure 14B:
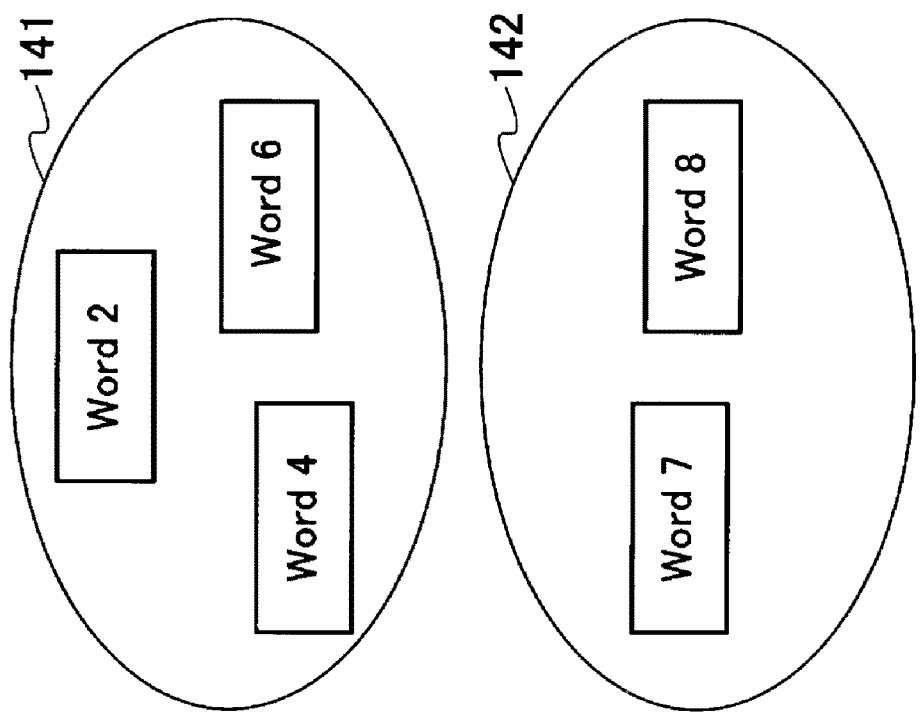
FIG. 14B is an explanatory view for explaining the second modified example of the question extraction unit.
Figure 14B:
Figure 14B:
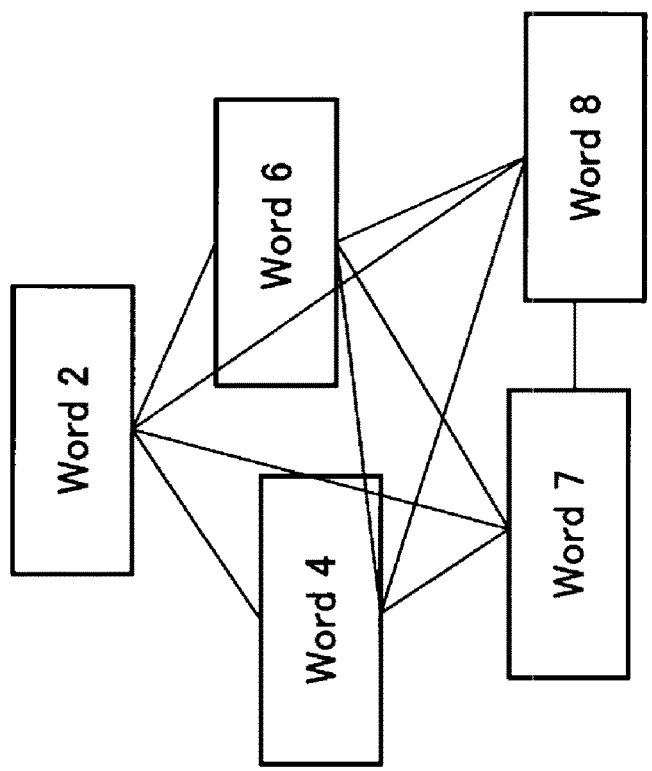

FIGS. 14A and 14B are explanatory views for explaining a second modified example of the question extraction unit 13. In this modified example, the question extraction unit 13 is configured to add the frequency vectors of all leaf nodes to calculate an overall frequency vector, cluster the words of the overall frequency vector in accordance with a distance between the words of the overall frequency vector, and extract a representative word for every cluster. The question presentation unit 14 questions the user about the values of the extracted words. That is, in this modified example, a word that collectively represents words that are close in distance (similar) is extracted for questioning the user.

In this modified example, a distance vector (distributed representation) D defining a distance (similarity) between any words is used. The distance vector D defines the distance between any two words. The distance is calculated using a commercial algorithm such as, for example, word2vec.

In the distance vector D illustrated in FIG. 14A, "1" indicates close in distance (similar) and "5" indicates far in distance (not similar). Note that the distance vector D is a symmetric matrix of n rows and n columns. For example, the distance between word 2 and word 3 is "5" in row 2, column 3. While the illustrated distance vector D includes word column X to indicate the distance vectors from "word 1" to "word n," this word column X need not be present. Further, because the distance vector D defines the distance for any word, a word that does not appear in any of the frequency vectors is also defined.

The question extraction unit 13 adds all frequency vectors of the leaf nodes to calculate an overall frequency vector F, as explained in FIG. 13. The question extraction unit 13 generates a distance vector DF obtained by extracting a matrix of words present in the overall frequency vector F of the distance vector D. The rows and columns with a strike-through in DF in FIG. 14A indicate that the rows and columns have been deleted and are not present.

FIG. 14B is a diagram (graph) schematically illustrating the distance between any two words using the distance of the distance vector DF for "word 2," "word 4," "word 6," "word 7," and "word 9" of the overall frequency vector F. The distances between "word 2" and "word 4" as well as "word 6" are each "1," indicating that the words are close in distance (that is, similar). The distance between "word 4" and "word 6" is also "1." On the other hand, the distances between "word 2" and "word 7" as well as "word 8" are each "5," indicating that the words are far in distance (that is, not similar). Further, the distance between "word 7" and "word 8" is "1," indicating that the words are close in distance.

The question extraction unit 13 uses the distance vector DF to cluster the words of the overall frequency vector F. That is, the question extraction unit 13 places words that are close in distance in the same cluster. As the clustering algorithm, a general algorithm such as, for example, k-means, is used. In the illustrated example, "word 2," "word 4," and "word 6" are in an identical cluster 141, and "word 7" and "word 8" are in another cluster 142. The question extraction unit 13 also uses the distance vector DF to similarly cluster the other words of the overall frequency vector F.

Then, the question extraction unit 13 extracts the representative word from the words belonging to the same cluster as a question to the user. The question extraction unit 13 uses, for example, the word having the highest value (that is, the highest frequency of occurrence) of the overall frequency vector F among the words belonging to the same cluster as the representative word. In the cluster 141 of FIG. 14B, in reference to the overall frequency vector F illustrated in FIG. 14A, the value "7" for "word 6" is the highest. In this case, the question extraction unit 13 extracts "word 6" as the representative word of the cluster 141. Note that the representative word may be a plurality of words having higher frequencies of occurrence.

For example, assume that "CPU frequency" and "CPU brand name" are formed in an identical cluster A, and "memory capacity" and "memory standard" are formed in another cluster B. In a case in which the frequency of occurrence of "CPU frequency" is higher than that of "CPU brand name" in the overall frequency vector F, the question extraction unit 13 extracts "CPU frequency" as the representative word rather than "CPU brand name" for the cluster A.

In this modified example, as compared to the embodiment described above, a plurality of similar words are integrated under a representative word for questioning, thereby reducing the number of answers to be given by the user and thus reducing the burden of the user.

Modified Example 3 of Question Extraction Unit

Figure 15:
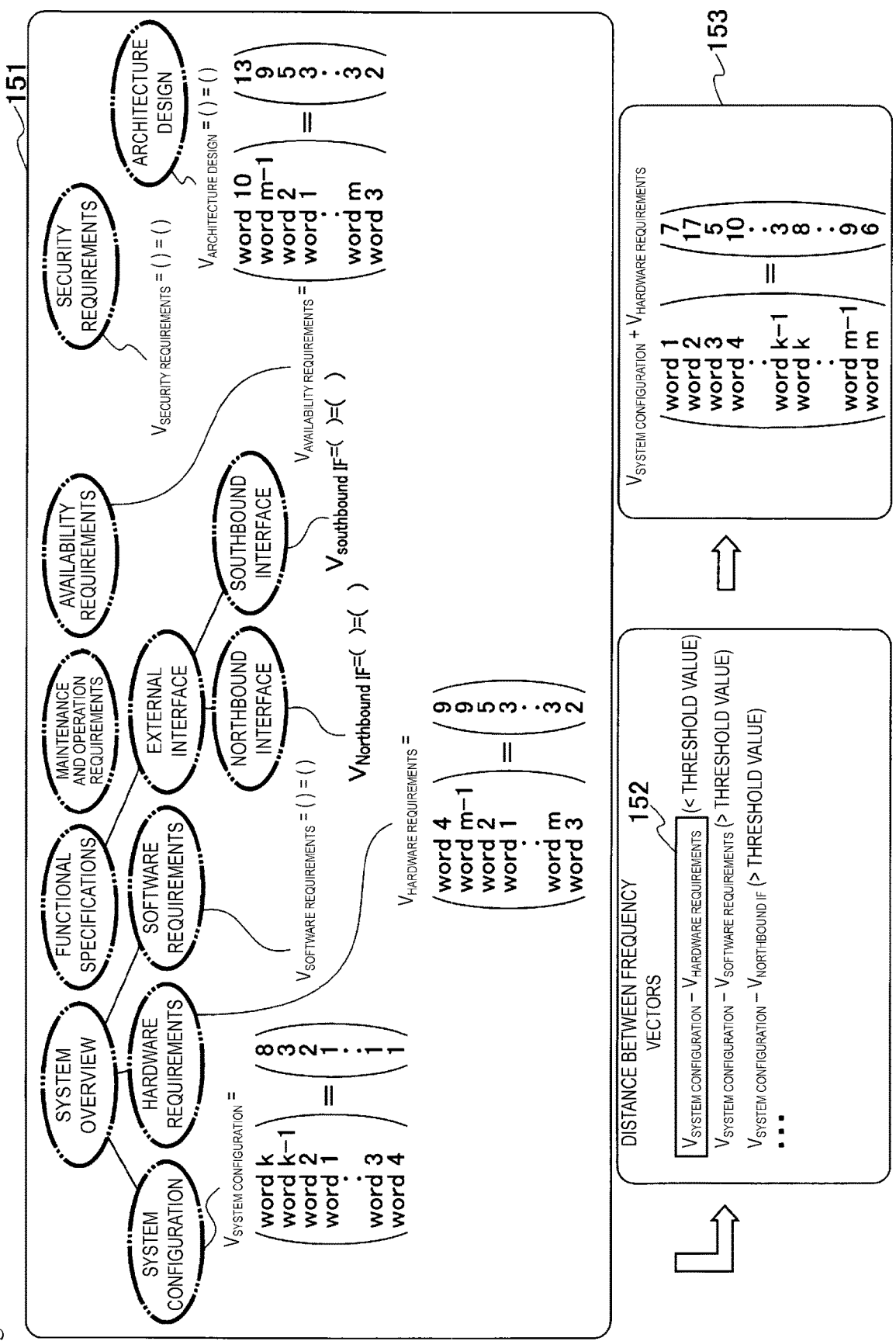
FIG. 15 is an explanatory view for explaining a third modified example of the question extraction unit.

FIG. 15 is an explanatory view for explaining a third modified example of the question extraction unit 13. In this modified example, the question extraction unit 13 is configured to calculate a distance of the frequency vectors of two of the leaf nodes and, when the distance is less than a threshold value, add the frequency vectors of the two leaf nodes to calculate a similar frequency vector, and extract a word having the highest frequency of occurrence or a plurality of words having higher frequencies of occurrence from the words of the similar frequency vector. The question presentation unit 14 questions the user about the values of the extracted words.

A tree structure 151 illustrated in FIG. 15 illustrates a portion of a tree structure that includes leaf nodes and a frequency vector for each leaf node. The question extraction unit 13 calculates a vector distance for each combination of two frequency vectors. The question extraction unit 13 calculates the vector distance by, for example, finding a cosine similarity between the two frequency vectors. When determining the distance between a frequency vector V1 and a frequency vector V2, the question extraction unit 13 adds a row of W=0 to V2 for a row of words W in V1 but not in V2. That is, padding is performed.

When combining two frequency vectors close in distance, the question extraction unit 13 adds the two frequency vectors and extracts the word having the highest frequency of occurrence or a plurality of words having higher frequencies of occurrence therein. The question extraction unit 13 determines that the words are close in distance (similar) and adds the frequency vectors when the calculated distance is less than the predetermined threshold value, and determines that the words are far in distance (not similar) and does not add the frequency vectors when the calculated distance is greater than or equal to the predetermined threshold value.

In the illustrated example, a distance 152 between the frequency vector of "System Configuration" and the frequency vector of "Hardware Configuration" is less than the predetermined threshold value. In this case, the question extraction unit 13 adds the frequency vector of "System Configuration" and the frequency vector of "Hardware Configuration" to generate a similar frequency vector 153. The question extraction unit 13 extracts "word 2" having the highest frequency of occurrence among the elements of the similar frequency vector 153 for questioning. Alternatively, the question extraction unit 13 may extract n words having higher frequencies of occurrence. n is an integer of one or greater.

In this modified example, similar frequency vectors are added to emphasize the features of these frequency vectors. As such, in this modified example, a word that appears across a plurality of leaf nodes but has a smaller frequency of occurrence when viewed in single leaf nodes can be determined and extracted as a highly important word.

Effects of the Present Embodiment

The document creation assistance apparatus 1 according to the present embodiment described above includes the tree structure generation unit 121 configured to analyze a learning document for system development and generate a tree structure showing separate sections of the learning document, the frequency calculation unit 122 configured to calculate, for every leaf node of the tree structure, a frequency vector of words that appear, the question extraction unit 13 configured to extract, on the basis of the frequency vector, words about which the user is to be questioned, the question presentation unit 14 configured to present questions about extracted words to the user and receive answers, and the document generation unit 15 configured to generate a document with the extracted words and the answers set in sections of the leaf nodes in the separate sections of the tree structure.

A document for system development, such as a requirement definition document or a design document, has clear separate sections and thus, in the present embodiment, the section composition is learned as a tree structure from existing documents for system development, such as a requirement definition document, the frequencies of occurrence of the words in each section are stored, and parameter values of the words having high frequencies of occurrence are input by the user, thereby assisting the user in document creation. That is, in the present embodiment, assistance is provided so as to facilitate creation of a document used in system development, even for a user unfamiliar with system development. As a result, even a user unfamiliar with system development can easily create a high quality document that covers necessary information by simply inputting parameters.

Specifically, in the present embodiment, it is possible to assist in creation of a document by extracting words (parameter) having high frequencies of appearance in a learning document, drawing the values thereof from the user, and presenting the user with a document in which the values are set in separate sections of a learning document.

Hardware Configuration

Figure 16:
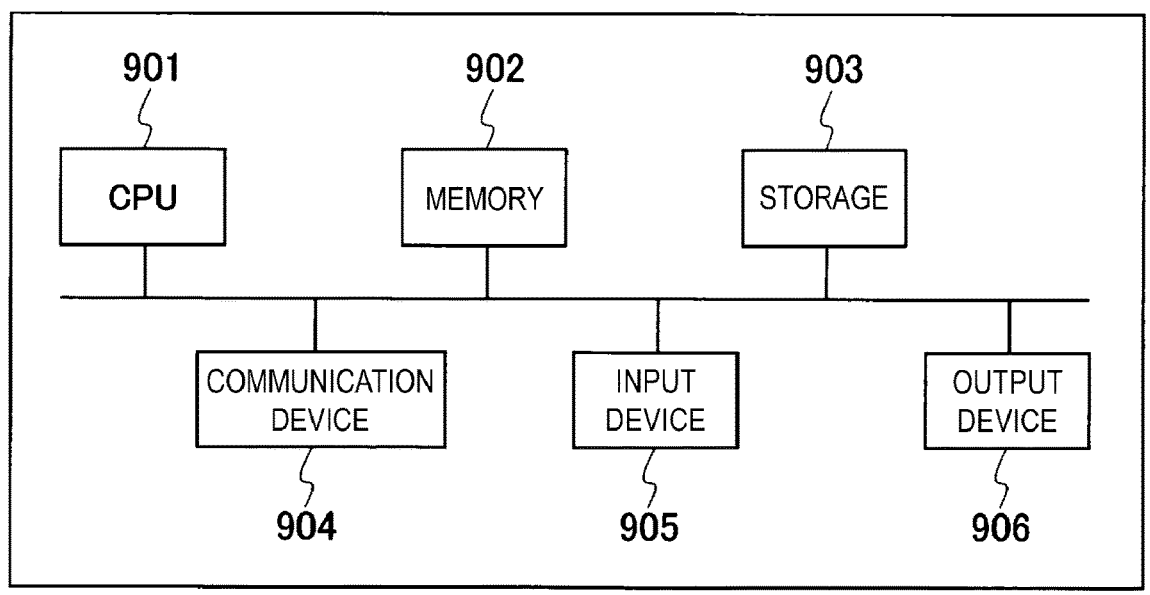
FIG. 16 is a hardware configuration example.

As the document creation assistance apparatus 1 described above, for example, a general-purpose computer system such as illustrated in FIG. 16 can be used. The illustrated computer system includes a central processing unit (CPU, processor) 901, a memory 902, a storage 903 (hard disk drive: HDD, solid state drive: SSD), a communication device 904, an input device 905, and an output device 906. The memory 902 and the storage 903 are storage devices. In this computer system, the CPU 901 executes a predetermined program loaded in the memory 902 to implement each function of the document creation assistance apparatus 1.

Further, the document creation assistance apparatus 1 may be implemented on one computer or may be implemented on a plurality of computers. Also, the document creation assistance apparatus 1 may be a virtual machine implemented on a computer.

The program for the document creation assistance apparatus 1 may be stored in a computer-readable recording medium such as an HDD, a SSD, a universal serial bus (USB) memory, a compact disc (CD), or a digital versatile disc (DVD) or may be distributed via a network.

The present disclosure is not limited to the above-described embodiments and modifications, and various modifications may be made within the scope of the gist of the present disclosure. For example, the document creation assistance apparatus 1 of the embodiment described above is connected to the user terminal 2 via a network, and the user accesses the document creation assistance apparatus 1 via the user terminal 2. Nevertheless, the document creation assistance apparatus 1 may be a terminal used by a user such as, for example, a PC, a tablet, or a smartphone.

REFERENCE SIGNS LIST

1 Document creation assistance apparatus
11 Input unit
12 Generation unit
121 Tree structure generation unit
122 Frequency calculation unit
13 Question extraction unit
14 Question presentation unit
15 Document generation unit
2 User terminal

The invention claimed is:

1. A document creation assistance apparatus comprising one or more processors configured to perform operations comprising:
analyzing a learning document for system development and generating a tree structure comprising a plurality of leaf nodes representing separate sections of the learning document, each section including a set of words;
calculating, for each leaf node of the tree structure, a frequency vector including a frequency value of each word included in the section of the leaf node;
performing a logical sum operation on a plurality of tree structures, each comprising the tree structure, to combine the plurality of tree structures;
adding a plurality of frequency vectors, each comprising the frequency vector, of a plurality of leaf nodes, each comprising the leaf node, to calculate an overall frequency vector;
extracting, for each leaf node, a word based on the overall frequency vector of the leaf node, wherein extracting the word for each leaf node comprises:
clustering words of the overall frequency vector in accordance with a distance between two of the words of the overall frequency vector, and extracting a representative word on a per cluster basis;
presenting a question about the extracted word to a user and receiving an answer comprising a value for the extracted word; and
generating, for each leaf node, a document by proving the value received in the answer to the extracted word in the section of the leaf node.

2. The document creation assistance apparatus according to claim 1, wherein the operations comprise:
extracting, per leaf node, a word having a highest frequency of occurrence or a plurality of words having higher frequencies of occurrence.

3. The document creation assistance apparatus according to claim 1, wherein the operations comprise:
adding a plurality of the frequency vectors of all of a plurality of the leaf nodes to calculate an overall frequency vector, and extracting a plurality of words having higher frequencies of occurrence from words of the overall frequency vector.

4. The document creation assistance apparatus according to claim 1, wherein the operations comprise:
calculating a distance of two of the frequency vectors of two of the leaf nodes and, when the distance is less than a threshold value, adding the two frequency vectors of the two leaf nodes to calculate a similar frequency vector, and extracting a word having the highest frequency of occurrence or a plurality of words having higher frequencies of occurrence from words of the similar frequency vector.

5. A document creation assistance method performed by a document creation assistance apparatus, the document creation assistance method comprising:

analyzing a learning document for system development and generating a tree structure comprising a plurality of leaf nodes representing separate sections of the learning document, each section including a set of words;
   calculating, for each leaf node of the tree structure, a frequency vector including a frequency value of each word included in the section of the leaf node;
   performing a logical sum operation on a plurality of tree structures, each comprising the tree structure, to combine the plurality of tree structures;
   adding a plurality of frequency vectors, each comprising the frequency vector, of a plurality of leaf nodes, each comprising the leaf node, to calculate an overall frequency vector;
   extracting, for each leaf node, a word based on the overall frequency vector of the leaf node, wherein extracting the word for each leaf node comprises:
   clustering words of the overall frequency vector in accordance with a distance between two of the words of the overall frequency vector, and extracting a representative word on a per cluster basis;
   presenting a question about the extracted word to a user and receiving an answer comprising a value for the extracted word; and
   generating, for each leaf node, a document by proving the value received in the answer to the extracted word in the section of the leaf node.

6. A non-transitory, computer-readable medium storing one or more instructions executable by a computer system to perform operations by a document creation assistance apparatus comprising:

analyzing a learning document for system development and generating a tree structure comprising a plurality of leaf nodes representing separate sections of the learning document, each section including a set of words;
   calculating, for each leaf node of the tree structure, a frequency vector including a frequency value of each word included in the section of the leaf node;
   performing a logical sum operation on a plurality of tree structures, each comprising the tree structure, to combine the plurality of tree structures;
   adding a plurality of frequency vectors, each comprising the frequency vector, of a plurality of leaf nodes, each comprising the leaf node, to calculate an overall frequency vector;
   extracting, for each leaf node, a word based on the overall frequency vector of the leaf node, wherein extracting the word for each leaf node comprises:
   clustering words of the overall frequency vector in accordance with a distance between two of the words of the overall frequency vector, and extracting a representative word on a per cluster basis;
   presenting a question about the extracted word to a user and receiving an answer comprising a value for the extracted word; and
   generating, for each leaf node, a document by proving the value received in the answer to the extracted word in the section of the leaf node.

\* \* \* \* \*